US005561209A

United States Patent [19]
Pieschnick et al.

[11] Patent Number: 5,561,209
[45] Date of Patent: Oct. 1, 1996

[54] PROCESS TO PREPARE POLYORGANOSILOXANES IN A THIN-FILM EVAPORATOR

[75] Inventors: Wolf Pieschnick, Nünchritz; Harald Schickmann, Meissen; Dieter Behnisch, Dresden, all of Germany

[73] Assignee: Huels Silicone GmbH, Nünchritz, Germany

[21] Appl. No.: 474,142

[22] Filed: Jun. 7, 1995

Related U.S. Application Data

[63] Continuation of Ser. No. 40,601, Mar. 31, 1993, abandoned.

[30] Foreign Application Priority Data

Apr. 16, 1992 [DE] Germany .......................... 42 12 754.8

[51] Int. Cl.$^6$ .......................... C08G 77/06; C08G 77/08
[52] U.S. Cl. .................................. 528/12; 528/21
[58] Field of Search ............................ 528/21, 12

[56] References Cited

U.S. PATENT DOCUMENTS

| | | |
|---|---|---|
| 2,883,272 | 4/1959 | Kirk . |
| 3,634,321 | 1/1972 | Nugent ........................ 528/10 |
| 3,853,934 | 12/1974 | Siciliano et al. . |
| 4,739,026 | 4/1988 | Riederer ...................... 528/21 |
| 5,173,558 | 12/1992 | Hansen ........................ 528/21 |

FOREIGN PATENT DOCUMENTS

| | | |
|---|---|---|
| 2229514 | 1/1974 | Germany . |
| 2705563 | 8/1978 | Germany . |

OTHER PUBLICATIONS

R. H. Perry et. al, "Perry's Chemical Engineer's Handbook", 6th ed. McGraw Hill Book Co, pp. 5–41 (1984).
Chemical Abstracts, vol. 83, No. 10, AN–80062y, A. G. Trufanov, et al, "Use of a Rotor Thin–Film Evaporator for Separating Poly(Ethylsiloxane) Liquids".
Database WPI, Derwent Publications Ltd., AN–75–18633, JP–B–50 004 399, Feb. 18, 1975.
Chemical Abstracts, vol. 114, No. 1, AN–6816q, JP–A–2 200 689, Okada, et al., Aug. 8, 1990.

*Primary Examiner*—D. R. Wilson
*Attorney, Agent, or Firm*—Oblon, Spivak, McClelland, Maier & Neustadt, P.C.

[57] ABSTRACT

A process for preparing polyorganosiloxanes having a viscosity ranging from 0.2 to 10,000 Pas (at 20° C.) by reaction of low molecular polyorganosilanols with each other or with oligomeric siloxanes in the presence of a catalyst system in a thin layer evaporator is disclosed. These products are silicone oils and silicone rubber polymers or starting materials for further modifications. The process is carried out at temperatures ranging from 80° to 200° C. and pressures ranging from 1 to 1000 mbar (abs.). The advantages include prevention of recycling through milder reaction conditions and reduction in the accumulation of intermediate fractions during product conversions.

5 Claims, No Drawings

PROCESS TO PREPARE POLYORGANOSILOXANES IN A THIN-FILM EVAPORATOR

This application is a Continuation of application Ser. No. 08/040,601, filed on Mar. 31, 1993, now abandoned.

BACKGROUND OF THE INVENTION

1. Field of the Invention:

The invention relates to a process for preparing polyorganosiloxanes by reaction, preferably through condensation, low molecular polyorganosiloxanols with each other or with oligomeric siloxanes in the presence of a known catalyst system. These products are silicone oils and silicone rubber polymers or starting materials for further modifications.

2. Discussion of the Background:

During the hydrolysis of organochlorosilanes, oligomeric siloxanes having both cyclic and linear or cross-linked structures are formed. For example, during the hydrolysis of diorganodichlorosilane mixtures comprising diorganocyclosiloxanes and linear α, ω-dihydroxypolydiorganosiloxanes are produced. The mixtures or their components are reacted into polymeric linear and/or cross-linked organosiloxanes as a function of the application. The kind of reaction can be influenced by the raw materials that are added, the catalyst system that is used and the process parameters pressure and temperature.

These reactions are usually conducted discontinuously, in agitating reactors, whose mixing action has been improved by the use of spiral stirrers (DE 17 70 048) and dissolver stirrers. However, a drawback lies in the long reaction times needed, typically ranging from 1 to 5 hours.

Development in this field is in the direction of continuous processes. Cell reactors comprising several stacked cells (DE 27 05 563) and tubular reactors (DE 34 39 543) in which catalysts are used, are known.

The development of suitable equipment has also had, among other things, the goal of lowering the content of volatile components such as cyclic polysiloxanes, and optionally of removing condensation water that is formed at the same time. By introducing screw mixers, such as the Ko-Mixer, single screw mixers or twin screw extruders (DE 17 19 321, DE 22 29 514, DE 39 14 912) for the aforementioned processes, residence times ranging from 2 to 13 minutes can be achieved owing to the more effective degassing possibilities and better exchange of heat and material.

The known processes for continuous production of polyorganosiloxanes exhibit the following drawbacks:

inadequate evaporation conditions due to a poor surface to volume ratio of the reaction mixture frequent foaming of the reaction mixture due to low gas volume in proportion to the quantity of reaction mixture in the reaction chamber wide molecular weight distribution, in the extreme case formation of gel particles, due to a wide residence time spectrum, which is caused by deposits in those parts of the reaction chamber around which there is no flow large quantities of nonuniform products that cannot be directly utilized and have intermediate viscosities due to the slow displacement of highly viscous products during the conversion from high to low specific viscosities different degrees of filling of the reaction chamber cause fluctuations in residence time and result in deviations from the targeted viscosity, thus leading to different viscosities in most of the conventional continuous processes remixing due to inadequate blocking of the conveyor members during the preparation of products with low viscosities, resulting in nonuniform polymers.

SUMMARY OF THE INVENTION

An object of the present invention is to provide a continuous process for the preparation of polyorganosiloxanes having a viscosity ranging from 0.2 to 10,000 Pas (at 20° C.) through reaction of low molecular polyorganosiloxanols with each other or with oligomeric siloxanes in the presence of known catalysts, in which process the cited drawbacks of the conventional methods can be reduced or circumvented. The high effectiveness of the process is due to mild reaction conditions whereby thermal stress on the products and secondary reactions are prevented.

DETAILED DESCRIPTION OF THE PREFERRED EMBODIMENTS

Polyorganosiloxanes of a viscosity ranging from 0.2 to 10,000 Pas (at 20° C.) can be obtained through reaction of oligomeric siloxanols with each other or with oligomeric siloxanes. The oligomeric siloxanols are obtained through hydrolysis of organochlorosilanes. They have linear or cross-linked structures, preferably linear, and contain —OH groups. Reaction of low molecular polyorganosiloxanols with each other or with oligomeric siloxanes, which are a mixture of cyclic, branched and linear siloxanes of low molecular weight without —OH groups, in the presence of known catalyst systems is conducted in a thin layer evaporator at temperatures ranging from 80° to 200° C. and pressures ranging from 1 to 1,000 mbar (absolute), wherein volatile products brought in by the starting material and/or produced during the reaction are removed.

For example, known basic or acid compounds such as alkali hydroxides, alkali siloxanolates, quaternary onium salts, acids, phosphonitrile halogenides and their solutions or reaction products can be used as catalysts. For final blocking, compounds of the general formula $R'(SiR_2O)_nSiR_2R'$ are used, where R denotes identical or different monovalent SiC-bonded organic groups or hydrogen, R' has the same meaning as R or denotes a monovalent unsaturated organic group having two to four carbon atoms, wherein to each silicon atom, to which hydrogen is directly bonded, a monovalent SiC-bonded organic group is also bonded, and n is a whole number between 1 and 50.

Potassium hydroxide is a preferred catalyst if low molecular polyorganosiloxanols are to be reacted with each other at reaction temperatures up to 150° C., preferably at 100° to 130° C. Phosphonitrile chloride is a preferred catalyst at reaction temperatures up to 200° C., especially 100° to 160° C. If low molecular weight polyorganosiloxanols are reacted with oligomeric siloxanes, phosphonitrile chloride is preferred, wherein the reaction temperatures are less than 200° C., especially 100° to 160° C. Phosphonitrile chloride can be prepared, for example, through reaction from phosphorus pentachloride and ammonium chloride according to U.S. Pat. No. 3,839,388; usually it is added dissolved in chlorinated hydrocarbons such as methylene chloride.

In silicone chemistry the thin layer evaporator is usually used as a devolatizing unit to separate off impurities, such as cyclic compounds produced in the preceding reactions, e.g., during the preparation of α, ω-dihydroxypolydiorganosiloxanes. It was surprising that the thin-layer evaporators could be used to advantage as the reaction apparatus, especially for the conversion of low molecular polyorganosiloxanols to silicone oils and silicone rubbers. All commercially available thin layer evaporators are suitable for the process of the invention.

Thin layer evaporators comprise a temperature-controlled cylindrical or conical part and a hood to separate off droplets dragged along under distillative reaction conditions. The reaction mixture is fed in front of the heating/cooling jacket and spreads out uniformly as a thin film on the tempered wall by means of a distributing ring and blades attached to the rotor. During the reaction volatile products brought in by the starting materials and/or the volatile products produced during the reaction are withdrawn through distillation at temperatures ranging from 80° to 200° C. and pressures ranging from 1 to 1,000 mbar (absolute). The product is conveyed helically on the tempered wall for discharging. Following a residence time, which can be varied between 0.2 and 30 minutes in accordance with the size of the evaporator, rotor and metering power and other technical conditions such as horizontal or vertical arrangement of the thin layer evaporator, speed, rotor shape and size of the heating surface, the product reaches the end of the evaporator and is discharged. The catalyst is neutralized or deactivated either in the bottom third of the thin layer evaporator or in a subsequent process.

The residence time of the products in the thin layer evaporator ranges from 0.2 to 30 minutes, preferably 0.3 to 3 minutes. It is possible to vary the process parameters, i.e., pressure, temperature, catalyst concentration and throughput. It is especially advantageous to control pressure with the aid of a process viscometer, which measures continuously, and thus to hold constant the desired final viscosity.

Compared to the known conventional methods, the procedure according to the invention offers the following advantages:

very low content of volatile components in the product high uniformity (narrow molecular weight distribution)

better space-time yields through shorter residence times as a consequence of better devolatization conditions for reaction products (e.g., condensation water)

very good control of the process (filling level, foaming, stability, starting and leaving)

remixing and thus related different molecular weight distribution are ruled out no quality restrictions due to gel particles caused by deposited products on the contact parts around which there is no flow possibility of virtually inertia-less control of the process with the goal of varying the viscosity of the final product by influencing the different process parameters (e.g., pressure) by means of a process viscometer.

Advantages that should be especially highlighted are milder reaction conditions, which reduce the thermal stress on the products and prevent recycling and the reduction of the accumulation of intermediate fractions during product conversions by small quantities of the reaction mixture in the reaction chamber and good emptying possibilities.

Other features of the invention will become apparent in the course of the following descriptions of exemplary embodiments which are given for illustration of the invention and are not intended to be limiting thereof.

EXAMPLES 1 to 4

A α, ω-dihydroxypolydimethylsiloxane having a viscosity of approximately 100 mPas (at 20° C.) was metered continuously in a thin layer evaporator with a temperable surface of 0.5 m$^2$; said α, ω-dihydroxypolydimethylsiloxane was premixed with a catalyst in a preceding mixer and heated to the reaction temperature. Reaction temperature, pressure and residence time and data on the obtained clear and odorless α, ω-dihydroxypolydimethylsiloxane are contained in Table 1.

The viscosities were measured in the continuous product flow and corrected to 20° C.

TABLE 1

| Example No. | Starting Material | | Reaction Conditions | | | | Final |
|---|---|---|---|---|---|---|---|
| | catal. ppm | neutralizer ppm | Metering Speed kg/h | Temp. °C. | Pressure mbar | Residence Time S | Product Viscosity mPas |
| 1 | 2.5[1] | 5[2] | 115 | 135 | 100 | 31 | 1,200 |
| 2 | 4[1] | 8[2] | 150 | 140 | 120 | 24 | 65,000 |
| 3 | 4[1] | 8[2] | 150 | 140 | 40 | 24 | 1,700,000 |
| 4 | 25[3] | 34[4] | 90 | 120 | 10 | 40 | 3,500 |

[1] phosphonitrile
[2] triisooctylamine
[3] potassium hydroxide
[4] 85% orthophosphoric acid The cyclic contents in the product were less than 0.6% by weight in all experiments.

The viscosity was held constant by way of a process viscometer, which controlled the process parameter pressure. Examples 2 and 3 show the transition of the viscosity 65,000 mPas to a viscosity of 1,700,000 mPas by lowering the pressure from 120 mbar (abs.) to 40 mbar (abs.). Within 0.5 minutes the new viscosity constant was reached.

EXAMPLE 5

30 kg/h of a α, ω-dihydroxypolydimethylsiloxane having a viscosity of approximately 100 mPas (at 20° C.) was metered continuously at 20° C., 2 kg/h of a α, ω-bis-trimethylsiloxypolydimethyl-siloxane having a viscosity of approximately 50 mPas (at 20° C.) was metered continuously and 50 ppm of phosphonitrile chloride, based on the total of the two siloxane components, were metered into the aforementioned thin layer evaporator. A trimethylsiloxy-end blocked polydimethylsiloxane having a viscosity of 5,500 mPas was obtained at a reaction temperature of 140° C., a pressure of 50 mbar and a residence time of 2 minutes.

The catalyst was deactivated by converting with 100 ppm triisooctylamine.

Obviously, numerous modifications and variations of the present invention are possible in light of the above teachings. It is therefore to be understood that within the scope of the appended claims, the invention may be practiced otherwise than as specifically described herein.

EXAMPLE 6

30 kg/h of a $\alpha, \omega$-dihydroxypolydimethylsiloxane having a viscosity of approximately 100 mPas (at 20° C.) was metered continuously 0.7 kg/h of a $\alpha, \omega$-dimethylvinylsiloxypolydimethyl-siloxane having a viscosity of 20 mPas (at 20° C.) was metered continuously at 20° C., and 60 ppm of phosphonitrile chloride, based on the total of the two siloxane components, were metered into the aforementioned thin layer evaporator. A trimethylvinylsiloxy-end blocked polydimethylsiloxane having a viscosity of 25,800 mPas was obtained at a reaction temperature of 150° C., a pressure of 50 mbar and a residence time of 2 minutes. The catalyst was deactivated by converting with 120 ppm triisooctylamine.

Numerous modifications of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing polyorganosiloxanes having a viscosity ranging from 0.2 to 10,000 Pas at 20° C. comprising: reacting low molecular weight polyorganosiloxanols with each other or with oligomeric siloxanes in the presence of a phosphonitrile chloride catalyst system, at temperatures ranging from 80° to 200° C. and absolute pressures ranging from 1 to 1000 mbar, wherein the reaction is conducted in a thin layer evaporator.

2. The process of claim 1, wherein low molecular weight polyorganosiloxanols react with each other.

3. The process of claim 1, wherein low molecular weight polyorganosiloxanols and oligomeric siloxanes react with each other.

4. The process of claim 3, wherein low molecular weight polyorganosiloxanols and linear oligomeric siloxanes react with each other.

5. Process of claim 1, wherein the residence time of the reaction mixture in the thin layer evaporator ranges from 0.2 to 30 minutes.

* * * * *